United States Patent
Akahoshi et al.

(10) Patent No.: US 7,719,939 B2
(45) Date of Patent: May 18, 2010

(54) OPTICAL DISK DRIVE AND METHOD FOR ALLOCATING SPARE AREA ON OPTICAL DISK MEDIUM

(75) Inventors: Kenji Akahoshi, Yokohama (JP); Taku Hoshizawa, Kawasaki (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1205 days.

(21) Appl. No.: 11/290,378

(22) Filed: Nov. 29, 2005

(65) Prior Publication Data

US 2006/0140093 A1    Jun. 29, 2006

(30) Foreign Application Priority Data

Nov. 29, 2004   (JP)   ............... 2004-344217

(51) Int. Cl.
G11B 5/09 (2006.01)
G11B 7/00 (2006.01)

(52) U.S. Cl. ............... 369/53.17; 369/47.14; 369/53.2; 369/275.3

(58) Field of Classification Search ............... 369/53.17, 369/53.15, 53.16, 53.2, 53.24, 53.42, 53.41, 369/275.3, 47.14, 53.35; 386/125, 95
See application file for complete search history.

(56) References Cited

U.S. PATENT DOCUMENTS

| | | | |
|---|---|---|---|
| 6,188,656 B1 | 2/2001 | Shoji et al. | |
| 6,469,978 B1 | 10/2002 | Ohata et al. | |
| 6,581,167 B1 | 6/2003 | Gotoh et al. | |
| 6,741,534 B1 * | 5/2004 | Takahashi et al. | 369/47.14 |
| 2002/0131350 A1 | 9/2002 | Kurobe et al. | |
| 2002/0150010 A1 | 10/2002 | Takahashi | |
| 2005/0220442 A1 * | 10/2005 | Kase et al. | 386/95 |
| 2006/0067190 A1 | 3/2006 | Kurobe et al. | |

FOREIGN PATENT DOCUMENTS

| | | |
|---|---|---|
| JP | 01-122080 A | 5/1989 |
| JP | 07-235139 A | 9/1995 |

(Continued)

OTHER PUBLICATIONS

Japan Patent Office (JPO) office action dated for JPO patent application JP2004-344217 (Jan. 30, 2009).

(Continued)

*Primary Examiner*—Ali Neyzari
(74) *Attorney, Agent, or Firm*—Townsend and Townsend and Crew LLP (57) ABSTRACT

On an optical disk medium, a spare area is allocated separately from a recording area. If the recording area includes a defective sector, alternate recording for the defective sector is performed in the spare area. An optical disk drive comprises: a medium information acquisition part which acquires, from the optical disk medium, medium information specific to the medium; and an area size determination part which determines the spare-area size suitable for the medium on the basis of the acquired medium information. The medium information is information about, for example, a media manufacturer, and a media type number. Further, there is provided a table which stores the relationship between the medium information and the optimum size of the spare area.

14 Claims, 8 Drawing Sheets

FOREIGN PATENT DOCUMENTS

| | | |
|---|---|---|
| JP | 2000-231727 A | 8/2000 |
| JP | 2000-293954 A | 10/2000 |
| JP | 2001-297516 A | 10/2001 |
| JP | 2002-279635 A | 9/2002 |
| JP | 2002-312950 A | 10/2002 |

OTHER PUBLICATIONS

Japan Patent Office (JPO) office action dated for JPO patent application JP2004-344217 (Aug. 14, 2008).

* cited by examiner

SPARE AREA SETTING TABLE A  107

| MEDIA ID | SPARE-AREA SIZE |
|---|---|
| AAA1234Z | 120MB |
| BBB1234Z | 200MB |
| CCC1234Z | 60MB |
| DDD1234Z | 120MB |
| ... | ...MB |

FIG.4B

SPARE AREA SETTING TABLE B  110

| MEDIUM PROPERTY MODULATION FACTOR (%) | SPARE-AREA SIZE |
|---|---|
| 0~59 | 200MB |
| 60~69 | 150MB |
| 70~79 | 100MB |
| 80~89 | 50MB |
| ... | ...MB |

OPTICAL DISK DRIVE AND METHOD FOR ALLOCATING SPARE AREA ON OPTICAL DISK MEDIUM

CLAIM OF PRIORITY

The present application claims priority from Japanese application serial No. JP 2004-344217, filed on Nov. 29, 2004, the content of which is hereby incorporated by reference into this application.

BACKGROUND OF THE INVENTION

1. Field of the Invention

The present invention relates to an optical disk drive capable of allocating, if a recording area on an optical disk medium includes a defective sector, a spare area for alternate-recording of the defective sector to another area on the medium, and it relates to a method for allocating a spare area on an optical disk medium.

2. Description of the Related Art

If rewritable optical disk media or write-once read-many optical disk media, including CD-R/RW, DVD±R/RW, and DVD-RAM, are each repeatedly used, a defect may occur in part of the optical disk medium. This is a defect caused by damage or a flaw of a medium, adhesion of fingerprints or a stain, aging of a recording film, or the like. Even if data is written to this defective part, the data cannot be successfully read out. It is difficult to prevent such a defect from occurring over the whole disk surface. For this reason, a defect management method is generally adopted. In this method, instead of writing data to a defective sector in which a defect has occurred, alternate recording for the defective sector is performed in a spare area that is allocated on the same optical disk.

At the time of initializing a format of an optical disk, an area having a fixed size (capacity) is usually allocated as the spare area. Because the spare area uses part of a user-data recording area, there is a limit of the size of the spare area that can be allocated. On the other hand, if the spare area is extended, an area to which a user can write data is decreased.

U.S. Pat. No. 6,469,978 discloses the technology for allocating a spare area whose size is variable. In the technology, application allows the size of a spare area to be changed so that the spare area can be properly allocated in response to frequency of accesses by users and the severity of data to be written.

SUMMARY OF THE INVENTION

In order to effectively use a given recording area for user data, the size of a spare area must be properly set.

The method disclosed in U.S. Pat. No. 6,469,978 can set the size of the spare area in response to the severity of data to be written. However, this patent does not take individual recording properties of each optical disk medium into consideration. To be more specific, a spare area having the same size is uniformly given both to a superior medium with superior recording properties, whose defect occurrence frequency is low, and to an inferior medium with inferior recording properties, whose defect occurrence frequency is high. As a result, most of the spare area allocated to the superior medium becomes unnecessary, whereas the spare area allocated to the inferior medium becomes insufficient so that alternate recording is likely to become impossible thereafter.

In addition, once a spare area is allocated, the spare area cannot be changed without formatting the spare area to erase the written data.

It is therefore an object of the present invention to allocate a spare area having the optimum size in response to the quality of an optical disk medium for improved user convenience.

According to one aspect of the present invention, there is provided an optical disk drive that includes: a medium information acquisition part which acquires, from an optical disk medium, medium information specific to the medium; an area size determination part which determines the spare-area size suitable for the medium on the basis of the acquired medium information; a notification part which notifies host equipment of the determined spare-area size; and an area allocating part which allocates a spare area on the medium according to an instruction from the host equipment.

Here, the medium information acquisition part acquires, as the medium information, information about a manufacturer and a type number of the optical disk media. In addition, the area size determination part includes a table which stores the relationship between the medium information and the spare-area size.

According to another aspect of the present invention, there is provided an optical disk drive that includes: a medium property measurement part which measures an optical disk medium for medium properties relating to error tolerance of the medium; an area size determination part which determines the spare-area size suitable for the medium on the basis of the measured medium properties; a notification part which notifies host equipment of the determined spare-area size; and an area allocating part which allocates a spare area on the medium according to an instruction from the host equipment.

Here, the medium property measurement part measures, as the medium properties, the recording sensitivity of the medium or the amount of axial deviation of a medium surface. In addition, the area size determination part includes a table which stores the relationship between the medium properties and the spare-area size.

The optical disk drive according to the present invention further comprises a table update part which updates the medium information, the medium properties, and a value of the spare-area size, which are stored in the table.

The optical disk drive according to the present invention further includes: a remaining amount detector which detects the remaining amount of the spare area during recording; and an area-size changing part which changes the size of the spare area on the basis of the detected remaining amount; wherein the area allocating part changes the size of the spare area for allocating the spare area on the medium.

According to still another aspect of the present invention, there is provided a method for allocating a spare area on an optical disk medium, which method includes the steps of: acquiring, from the optical disk medium, medium information specific to the medium; determining the spare-area size suitable for the medium on the basis of the acquired medium information; and allocating a spare area having the determined size on the medium.

According to a further aspect of the present invention, there is provided a method for allocating a spare area on an optical disk medium, which method includes the steps of: measuring the optical disk medium for medium properties relating to error tolerance of the medium; determining the spare-area size of the medium on the basis of the measured medium properties; and allocating a spare area having the determined size on the medium.

According to the present invention, allocating a recording area that is suitable for the quality of an optical disk medium produces an effect of improving user convenience.

BRIEF DESCRIPTION OF THE DRAWINGS

Theses and other features, objects and advantages of the present invention will become more apparent from the following description when taken in conjunction with the accompanying drawings.

DETAILED DESCRIPTION OF THE PREFERRED EMBODIMENTS

Preferred embodiments of the present invention will be described with reference to the drawings below.

First Embodiment

Figure 1:
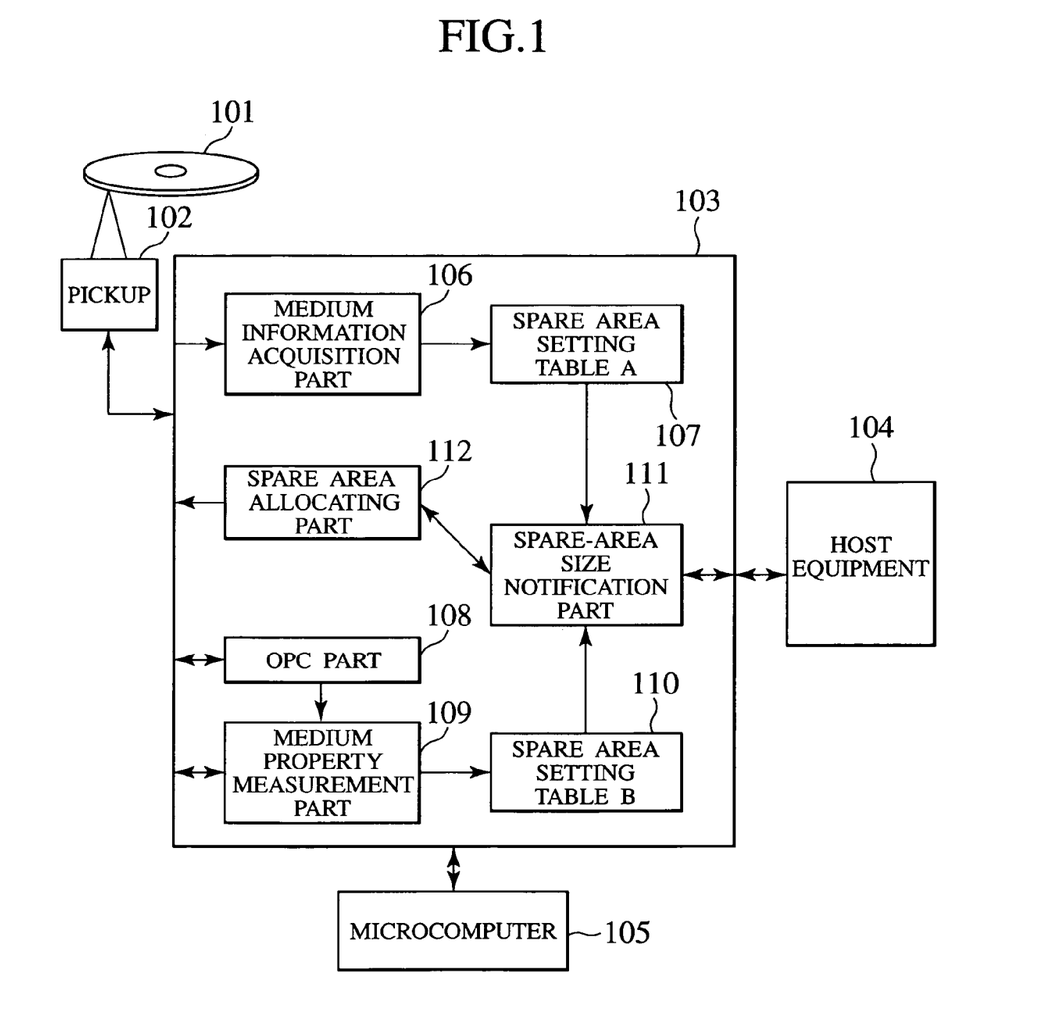
FIG. 1 is a block diagram illustrating one embodiment of an optical disk drive according to the present invention.

FIG. 1 is a block diagram illustrating one embodiment of an optical disk drive according to the present invention.

An optical disk medium (hereinafter referred to as "optical disk") 101 is a rewritable medium or a write-once read-many medium, such as CD-R/RW, DVD±R/RW, and DVD-RAM. Specific information about the disk medium (hereinafter referred to as "medium information", which includes a media manufacturer name, and a medium type number) is written to the disk beforehand. A pickup 102 writes data to the optical disk 101 that is mounted, and reads out data from the optical disk 101. The data to be read out also includes the medium information.

A read and write processing part 103 processes data that is written/read with the pickup 102 and transmits/receives the processed data to/from host equipment 104, which is located outside and to which the read and write processing part 103 is connected. A microcomputer 105 controls the read and write processing part 103. The read and write processing part 103 includes a medium information acquisition part 106 which acquires the above-mentioned medium information from the data read out by the pickup 102.

The size (the capacity) of a spare area to be allocated on the optical disk 101 is stored in a spare area setting table A 107. The spare area setting table A 107 is used to determine the size of the spare area in response to the medium information (medium IDs including a media manufacturer name, a medium type number). Here, the spare area is such that, if a defect occurs on the optical disk, instead of writing data to a defective sector where the defect has occurred, the data is written to the spare area allocated on the same optical disk, and thus alternate recording for the defective sector is performed.

A spare-area size notification part 111 notifies the host equipment 104 of a value of the spare-area size which has been determined by the spare area setting table A 107. On the basis of the received value of the spare-area size, the host equipment 104 issues, to a spare area allocating part 112, an instruction to allocate a recording area on the optical disk 101 in question so that a spare area having the above-mentioned size is allocated.

Further, the read and write processing part 103 includes an optimum power calibration (OPC) part 108, and a medium property measurement part 109. By use of them, the optimum recording laser power to be supplied to the optical disk 101 is set, and data that has been written with the set power is read out to evaluate the quality of the optical disk 101. Here, the quality to be evaluated includes properties of the medium, such as the recording sensitivity of an optical disk, and the amount of axial deviation of a medium surface, which are used as indicators of tolerance to the occurrence of an error. The spare area setting table B 110 specifies the size (the capacity) of a spare area to be allocated on the optical disk 101, and is used to determine the size of a spare area in response to the properties of the medium (the recording sensitivity of the optical disk, the amount of axial deviation of a medium surface, and the like).

The spare-area size notification part 111 notifies the host equipment 104 of a value of the spare-area size which has been determined by the spare area setting table B 110. On the basis of the received value of the spare-area size, the host equipment 104 issues, to a spare area allocating part 112, an instruction to allocate a recording area on the optical disk 101 for allocation of a spare area having the above-mentioned size.

In this embodiment, two systems are used in combination to determine the size of a spare area. That is to say, the two spare area setting tables A107, B110 are provided to be properly used according to the situations. However, the use of only one of the systems also suffices.

Although omitted in FIG. 1, with the object of performing the above operation, the read and write processing part 103 further comprises: a servo controller which controls the pickup 102; a data modulation/demodulation part; an error correction part; a temporary storage unit which temporarily stores data; a temporary storage controller which controls the temporary storage unit; and a host I/F part which exchanges data with the host equipment 104 according to a protocol typified by the ATAPI (AT Attachment Packet Interface).

Figure 2:
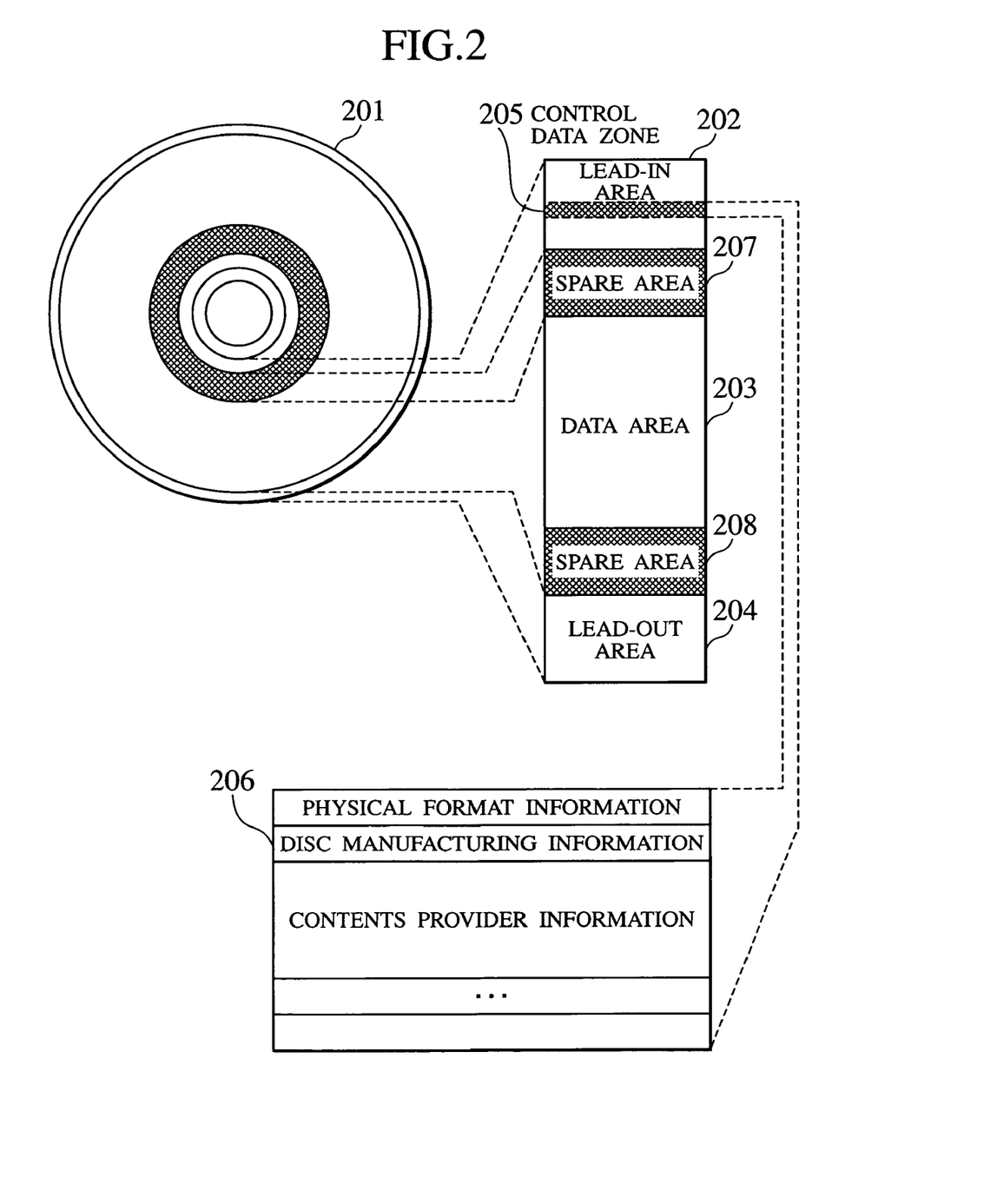
FIG. 2 is a diagram illustrating as an example a disk layout of an optical disk medium (DVD-RAM)

FIG. 2 is a diagram illustrating a disk layout of an optical disk medium, taking a DVD-RAM as an example. From the inner circumference toward the outer circumference, a DVD-RAM medium 201 includes: a lead-in area 202 to which various kinds of information are written; a data area 203 to which data is written; and a lead-out area 204. The lead-in area 202 includes a control data zone 205. Moreover, this control data zone includes disk specific information (disc manufacturing information) 206 indicating a media manufacture name and a medium type number. The data area 203 includes spare areas 207, 208 used to perform alternate recording when a defect occurs.

Figure 3A:
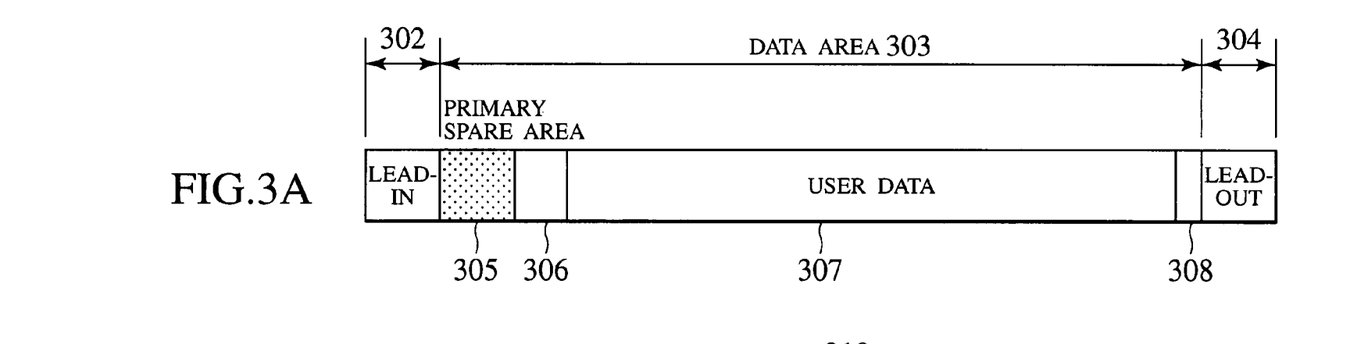
FIGS. 3A through 3C are diagrams each illustrating as an example a defect handling method used for an optical disk medium (DVD-RAM)
Figure 3B:
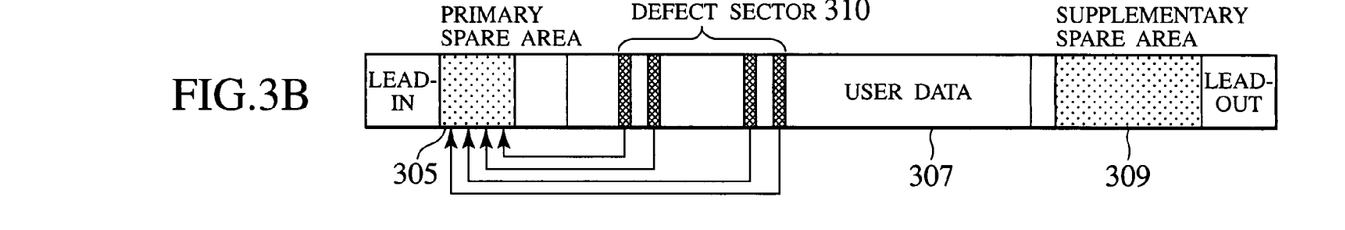
Figure 3C:
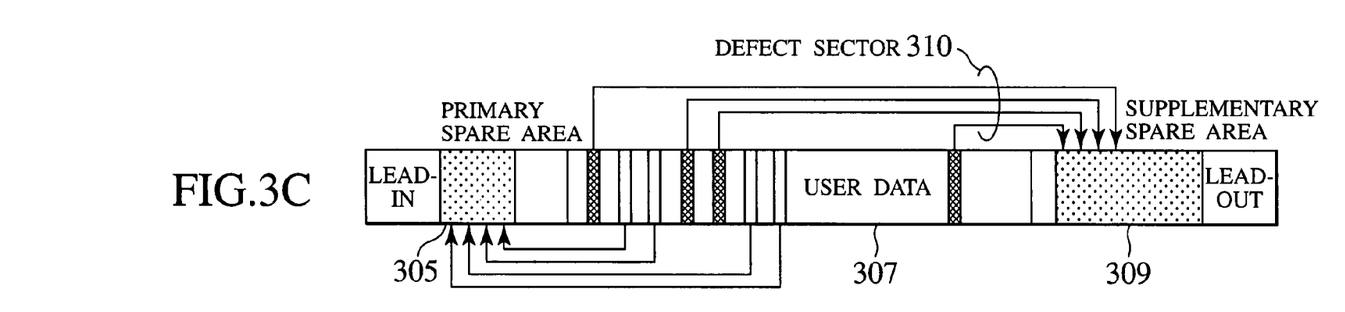

Next, FIGS. 3A, 3B, 3C are diagrams each illustrating a defect handling method for handling a defect of an optical disk medium with a case of a DVD-RAM being used as an example.

FIG. 3A is an area configuration diagram illustrating an optical disk with no defect before shipment. As shown in FIG.

2, the optical disk medium includes a lead-in area 302, a data area 303, and a lead-out area 304. A primary spare area 305 is allocated in the data area 303 on the inner circumferential side of the disk. This area 305 is used as a spare area for initial defects detected immediately after the disk is manufactured. However, the area 305 is also used as a spare area for defects detected during data writing. Areas 306, 308 that are located on the inner and outer circumferential sides, respectively, of the disk store management information of a file system. Accordingly, an area 307 which users can actually use corresponds to an area obtained by subtracting the areas 305, 306, 308 from the data area 303.

FIGS. 3B and 3C are diagrams each illustrating a defect handling method used when a defect is detected during data writing. A DVD-RAM can allocate, in addition to the primary spare area 305, a supplementary spare area 309 on the outer circumferential side of the disk. At the time of disk initialization of the DVD-RAM, this supplementary spare area 309 is allocated beforehand according to an instruction from the host equipment side (to be exact, an instruction from application). The size of this supplementary spare area 309 can also be specified from the optical disk drive side to the host equipment side.

If defect sectors 310 are detected during data writing, as shown in FIG. 3B, alternate recording to the primary spare area 305 is first performed as indicated with arrows. When this primary spare area 305 becomes full of alternate recording data, as shown in FIG. 3C, the alternate recording to the supplementary spare area 309 is performed as indicated with arrows. If a defect is handled, position information about a defect area and a spare area is written to a defect management area of the lead-in area 302, and that of the lead-out area 304.

Figure 4A:
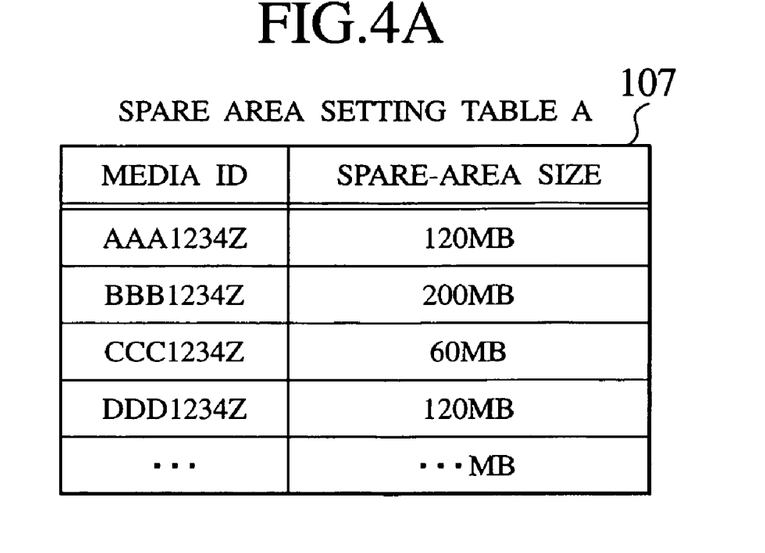
FIGS. 4A and 4B are diagrams illustrating an example of spare area setting tables A and B according to this embodiment.
Figure 4B:
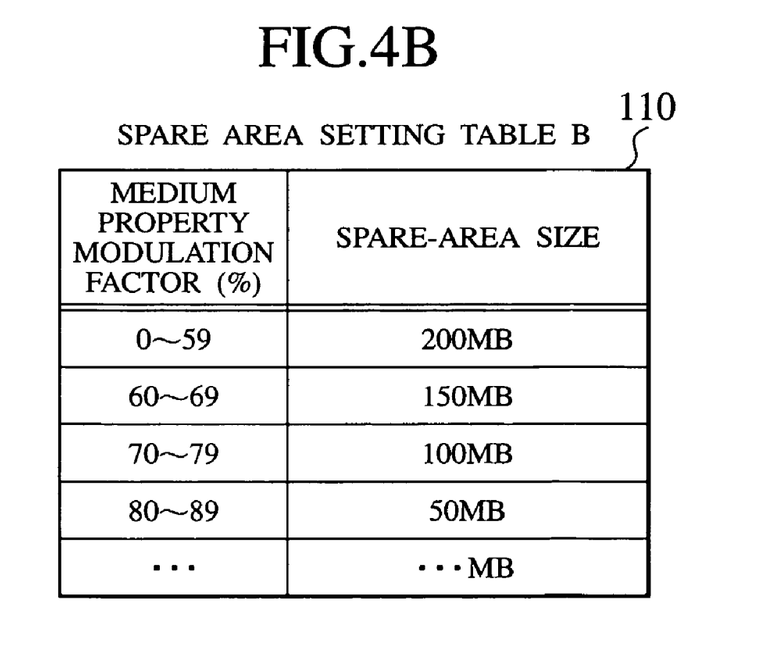

FIGS. 4A and 4B are diagrams illustrating one example of the spare area setting tables A 107, B 110 shown in FIG. 1. FIG. 4A corresponds to the spare area setting table A 107; FIG. 4B corresponds to the spare area setting table B 110.

Defects of a disk are usually caused by fingerprints, stains, aging of recording film, a flaw as a result of partial damage of a medium, and the like, all of which result from repeated use of the optical disk. However, there is also a case where a defect is caused by an originally existing failure in the quality of the disk. Accordingly, it is expected that the number of times alternate recording is performed on such a defective disk will be larger than the number of times the alternate recording is performed on a disk with normal quality. In contrast with this, if the quality of the disk is higher than usual, the number of times the alternate recording is performed decreases. On the other hand, the size of a spare area has a complementary relationship with the size of a user data area. In this embodiment, instead of uniformly setting spare-area sizes, the optimum size of the spare areas is set in response to the quality of a disk medium so as to effectively allocate user data areas.

Therefore, what should be paid attention to here is the fact that each disk medium is provided with a unique ID, which is specific to the disk. This ID specific to the disk is called a "medium ID". A media manufacturer which manufactured the disk, a medium type number, and the like, are written as the medium ID. In this embodiment, a judgment as to whether or not the quality of the disk is good is made by the medium ID. Accordingly, quality surveys of disks are performed in advance on a media manufacturer basis or on a medium type number basis, and thereby the size of a required spare area is estimated for each media manufacturer or for each medium type number. Then, as shown in FIG. 4A; the table A 107 indicating the optimum size of a spare area on a medium ID basis is created and stored.

When an optical disk is mounted, the optimum size of a spare area is determined with reference to this table A 107, and is then transmitted to the spare-area size notification part 111. The spare-area size notification part 111 notifies the host equipment 104 of the spare-area size. The host equipment then instructs the spare area allocating part 112 to allocate a spare area on the optical disk according to the received size.

Next, a description will be made of processing performed in a case where a medium ID of a mounted optical disk is not registered in the table A 107. In this case, medium properties of the optical disk in question are first measured, and then a judgment as to whether or not the quality of the optical disk is good is made from the measurement.

Before starting the measurement of the medium properties, the OPC part 108 first performs optimum power calibration (OPC) so that the radiation intensity of a laser light beam with which the optical disk is irradiated is set at an optimum value. Next, the medium property measurement part 109 writes, as a test, a test signal to a specific area (for example, a test write area) on the disk with the optimum power obtained by the OPC part 108, and then reads out the signal. The recording sensitivity, and the amount of axial deviation of a medium surface, which reflect the quality of the disk, are measured from the read signal. Specific parameters to be acquired include: a β value (an indicator into which the depth of recording bits is converted in numerical terms); a modulation factor (an amplitude value PP generated by the longest recording mark and space); the number of PI errors; and a jitter value. These parameters are medium properties relating to the tolerance to an error of the optical disk. Other parameters can also be adopted.

Here, the size of a required spare area is assigned to the acquired medium properties. FIG. 4B illustrates an example of the table B 110 used for the assignment, and accordingly illustrates the relationship between a modulation factor as a parameter and the size of a spare area. In order for DVD players to normally read the disk, the modulation factor needs to be greater than or equal to 60% of its specification value. Therefore, values of the modulation factor are grouped into ranks and a spare area is provided with the larger size with decrease in modulation factor.

When an optical disk is mounted, if a medium ID thereof is unknown, the optimum size of a spare area is determined with reference to the table B 110, and is then transmitted to the spare-area size notification part 111. The spare-area size notification part 111 notifies the host equipment 104 of the spare-area size. The host equipment then instructs the spare area allocating part 112 to allocate a spare area on the optical disk according to the received size.

In the above embodiment, if a medium ID of the optical disk is unknown, the size of the spare area is determined according to the measurements of the medium properties. However, instead of using a medium ID, the size of the spare area may be determined according to the measurements of the medium properties of all optical disks.

Figure 5A:
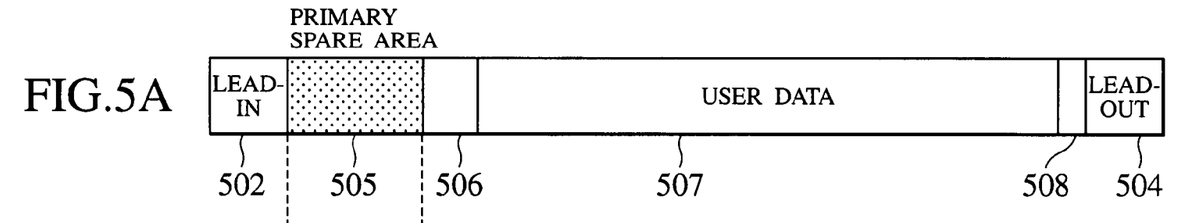
FIGS. 5A through 5D are diagrams each illustrating the size of a spare area which is set according to this embodiment.
Figure 5B:
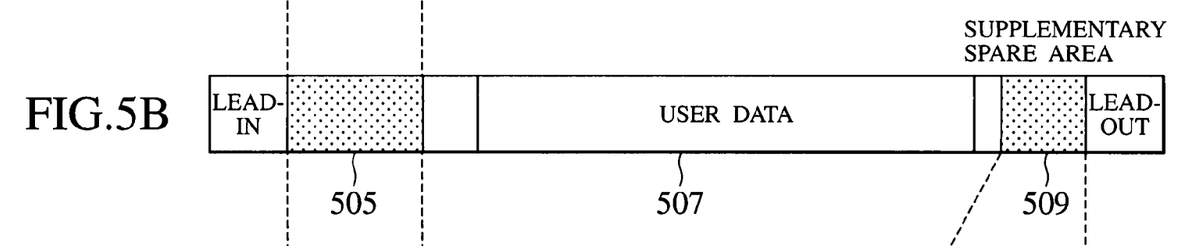
Figure 5C:
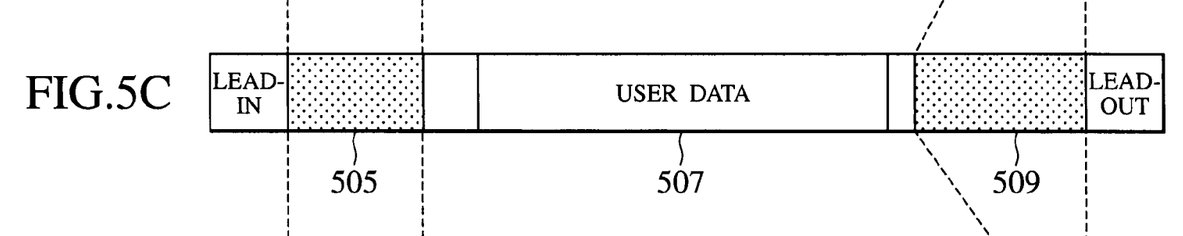
Figure 5D:
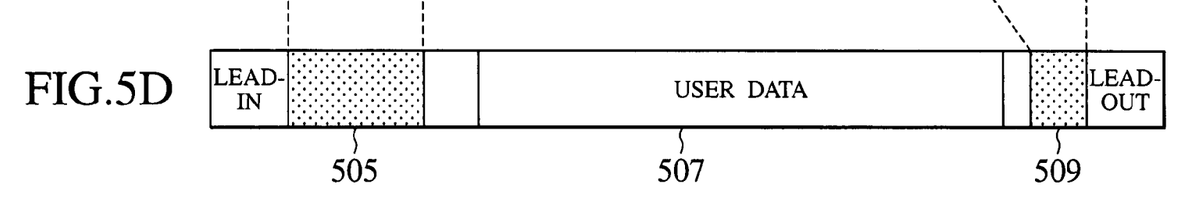

FIGS. 5A through 5D are diagrams each illustrating the size of a spare area which is set according to this embodiment. FIG. 5A illustrates a case where only a primary spare area 505 is allocated, that is to say, a supplementary spare area is not allocated. FIG. 5B illustrates a case where an optical disk with standard quality is used and a supplementary spare area 509 is further allocated. FIG. 5C illustrates a case where an optical disk with inferior quality is used and the supplementary spare area 509 whose size is set at a large value. FIG. 5D illustrates a case where an optical disk with superior quality is used and the supplementary spare area 509 whose size is set at a small value.

In the above description, although the two spare areas 505, 509 are allocated, only the size of the supplementary spare area 509 is variable. However, the size of both spare areas, including the size of the primary spare area 505, may also be variable.

According to this embodiment, the respective optimum sizes of the spare areas 505, 509 are determined in response to the quality of the disk so that the spare areas 505, 509 can be properly allocated on the disk. As a result, it is possible to effectively set the recording area 507 which users can use. This leads to an improvement in convenience.

Figure 6:
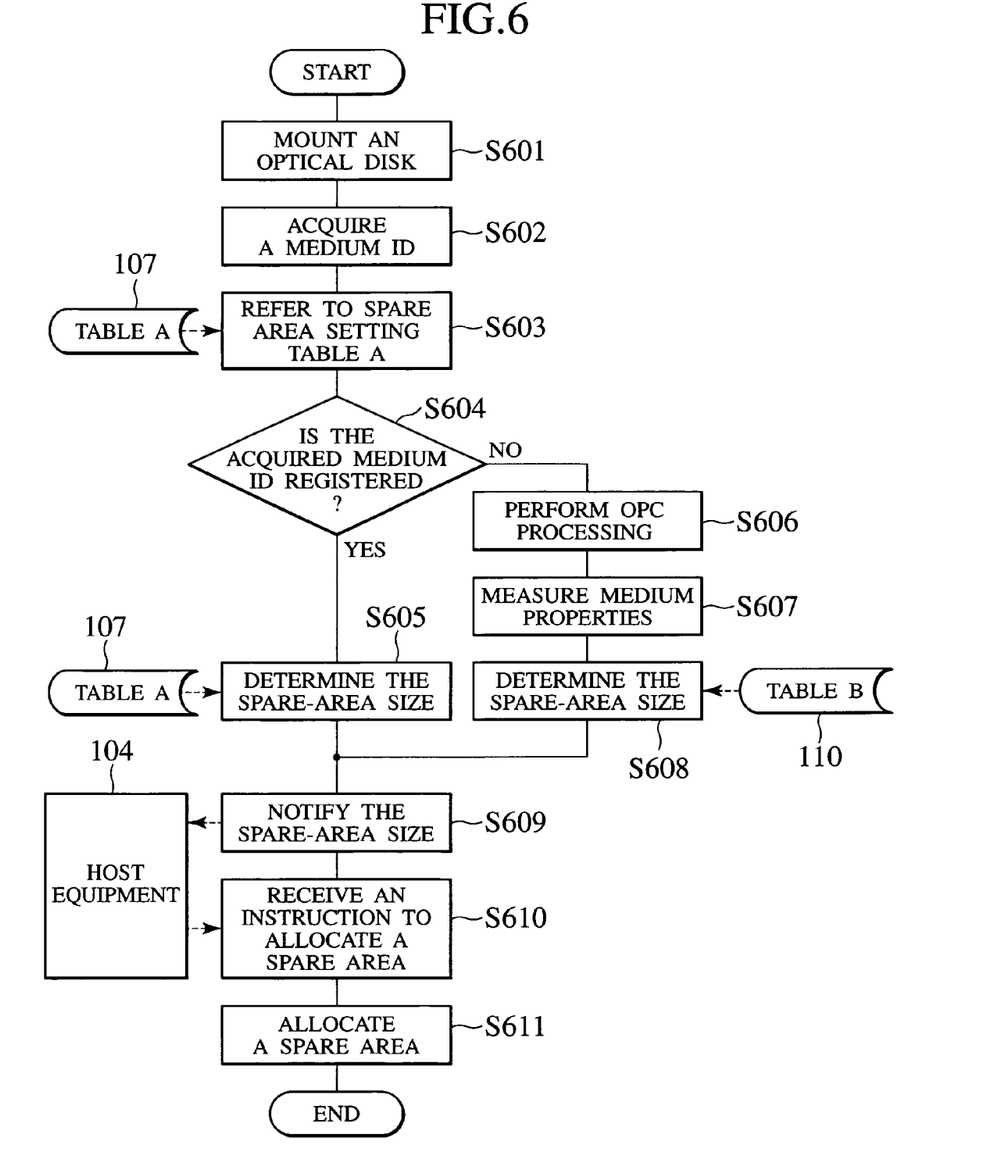
FIG. 6 is a flowchart illustrating an example of a spare area allocating method according to the present invention.

FIG. 6 is a flowchart illustrating how the above-mentioned spare area is allocated according to this embodiment.

In step S601, an optical disk is mounted. In step S602, medium information is read out from the optical disk to acquire a medium ID. In step S603, the spare area setting table A 107 relating to the medium ID is referred to. In step S604, a judgment is made as to whether or not the acquired medium ID is registered in this table A 107. If the medium ID is registered, the spare-area size corresponding to the medium ID is read out from the table A 107 to determine the size in step S605.

If the acquired medium ID is not registered, OPC processing is performed (the optimum recording power is set) in step S606, and subsequently, medium properties are measured in step S607. At the time of the measurement, a modulation factor of the medium is determined as, for example, a quality parameter. In step S608, with reference to the spare area setting table B 110 relating to medium properties, the spare-area size corresponding to a value of the modulation factor is read out to determine the size.

In step S609, the host equipment is notified of the spare-area size. In step S610, the host equipment returns an instruction to allocate a spare area. In step S611, a spare area is allocated on the optical disk according to the instruction from the host equipment.

Second Embodiment

Figure 7:
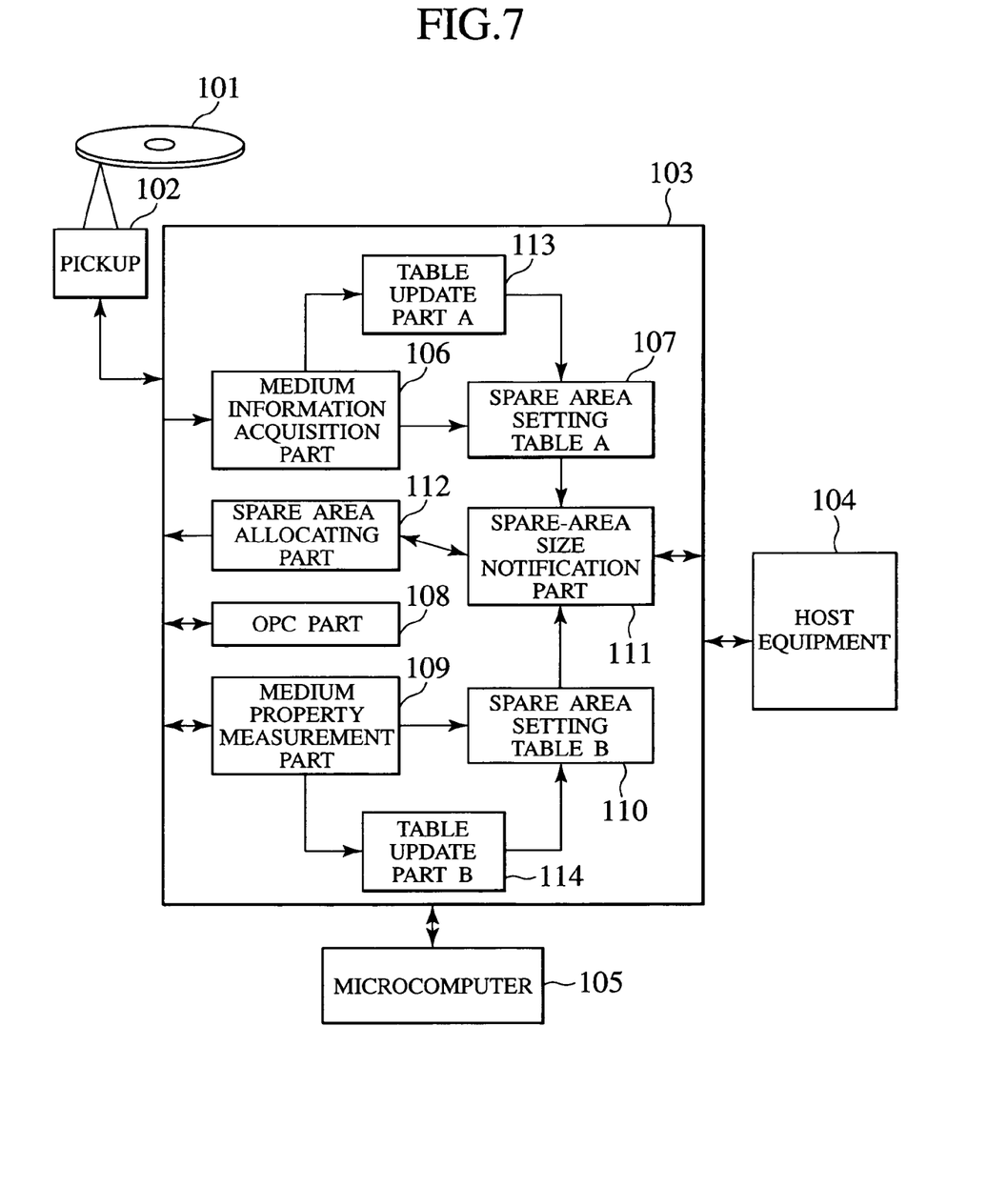
FIG. 7 is a block diagram illustrating another embodiment of an optical disk drive according to the present invention.

FIG. 7 is a block diagram illustrating a second embodiment of the optical disk drive according to the present invention.

In this embodiment, a table update part A 113 and a table update part B 114 are additionally provided in the read and write processing part 103 of the first embodiment shown in FIG. 1. The table update part A 113 and the table update part B 114 are used to update (change) size values registered in the table A 107 and the table B 110, respectively. For example, if the size which was provided as an initial value does not suit actual situations in which defects occur, correcting a size value in the table makes it possible to reflect the corrected size value on the table to be referred to next time.

In addition, for a new medium ID that is not registered in the table A 107, if the spare-area size which has been determined in steps S606 through S608 in FIG. 6 is additionally registered in the table A 107, a spare area can be quickly allocated by use of the table A 107 from the next time.

Incidentally, the tables A 107, B 110 can be updated by updating firmware and installing it without using the table update parts 113, 114 described above.

According to this embodiment, it is possible to learn the actual situations in which defects occur, and thereby to create a table registering the spare-area size that reflects the actual situations. Therefore, a given recording area can be used with higher efficiency.

Third Embodiment

Figure 8:
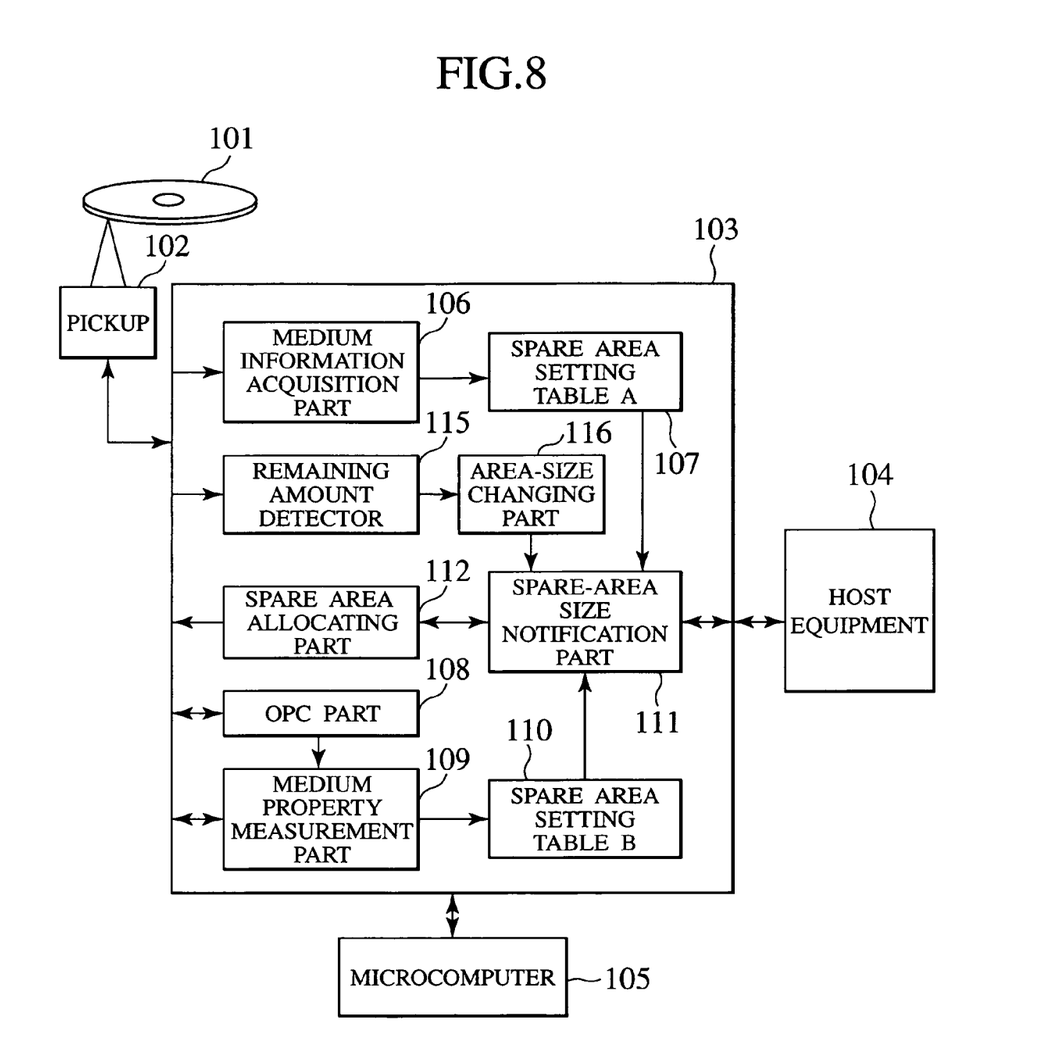
FIG. 8 is a block diagram illustrating still another embodiment of an optical disk drive according to the present invention.

FIG. 8 is a block diagram illustrating a third embodiment of the optical disk drive according to the present invention.

In this embodiment, a spare area-remaining amount detector 115 and an area-size changing part 116 are additionally provided in the read and write processing part 103 of the first embodiment shown in FIG. 1. This remaining amount detector 115 detects the current remaining amount of the spare area on the optical disk, which spare area is initially allocated by the spare area allocating part 112. The area-size changing part 116 changes the size of the spare area on the basis of the detected remaining amount. In other words, the size of the spare area is properly increased or decreased during recording. Heretofore, the spare-area size in an initial format is configured to be kept unchanged, and accordingly the spare-area size is not changed in midstream. The spare area allocating part 112 and the area-size changing part 116 become effective if the size change in midstream is allowed.

Usually, if the medium IDs of disks are the same, the disks have no difference therebetween in quality. However, because of a difference in disk quality caused by a difference between lots, there is a possibility that a flaw on a disk or dust causes the quality of the disk to become worse than expected. In other words, if data is actually written, the occupied amount of the spare area becomes larger than expected, resulting in an insufficient spare area.

In DVD-RAMs, because the occupied amount of a spare area is written to a management area, it is possible to easily detect the remaining amount of the allocated spare area. The remaining amount detector 115 monitors the remaining amount of this spare area. If the remaining amount becomes lower than the predetermined amount (a threshold value), the remaining amount detector 115 instructs the host equipment 104 to increase the size of the spare area. In this situation, if the host equipment 104 is configured to issue an instruction to extend the spare area, the insufficiency of the spare-area does not occur.

Thus, even if a medium whose disk quality is worse than expected is used, it is possible to solve the problem of an insufficient spare area by extending the initially allocated spare area later. This makes it possible to allocate an optimum spare area. In contrast with this, if the disk quality is better than expected, it is also possible to reduce the size of the initially allocated spare area in midstream.

According to this embodiment, while writing data, it is possible to properly change the spare-area size in response to the actual situations in which defects occur. Therefore, a given recording area can be used with higher efficiency.

Application of the present invention is not limited to the DVD-RAMs described in the above embodiments. The present invention can be applied to write-once read-many optical disk media and rewritable optical disk media as a whole, including Blue-ray, and HD DVD. Moreover, the present invention can also be broadly applied not only to the optical disk media, but also to other recording media each having a spare area.

While we have shown and described several embodiments in accordance with our invention, it should be understood that disclosed embodiments are susceptible to changes and modifications without departing from the scope of the invention. Therefore, we do not intend to bound by the details shown and described herein but intend to cover all such changes and modifications as fall within the ambit of the appended claims.

What is claimed is:

1. An optical disk drive that is connected to external host equipment, said optical disk drive being capable of allocating, if a recording area on an optical disk medium includes a defective sector, a spare area for alternate-recording of the defective sector to another area on the medium, said optical disk drive comprising:
   a medium information acquisition part which acquires, from the optical disk medium, medium information specific to the medium;
   an area size determination part which determines a spare-area size suitable for the medium on the basis of the acquired medium information;
   a notification part which notifies the host equipment of the determined spare-area size; and
   an area allocating part which allocates a spare area on the medium according to an instruction from the host equipment.

2. The optical disk drive according to claim 1, wherein:
   said medium information acquisition part acquires, as the medium information, information about a manufacturer and a type number of the optical disk medium.

3. The optical disk drive according to claim 1, wherein:
   said area size determination part includes a table which stores the relationship between the medium information and the spare-area size.

4. An optical disk drive that is connected to external host equipment, said optical disk drive being capable of allocating, if a recording area on an optical disk medium includes a defective sector, a spare area for alternate-recording of the defective sector to another area on the medium, said optical disk drive comprising:
   a medium property measurement part which measures the optical disk medium for medium properties relating to error tolerance of the medium;
   an area size determination part which determines the spare-area size suitable for the medium on the basis of the measured medium properties;
   a notification part which notifies the host equipment of the determined spare-area size; and
   an area allocating part which allocates a spare area on the medium according to an instruction from the host equipment.

5. The optical disk drive according to claim 4, wherein:
   said medium property measurement part measures, as the medium properties, a recording sensitivity of the medium or an amount of axial deviation of a medium surface.

6. The optical disk drive according to claim 4, wherein:
   said area size determination part includes a table which stores the relationship between the medium properties and the spare-area size.

7. A method for allocating a spare area on an optical disk medium, in which if a recording area on the optical disk medium includes a defective sector, the spare area for alternate-recording of the defective sector is allocated to another area on the medium, said method comprising the steps of:
   acquiring, from the optical disk medium, medium information specific to the medium;
   determining the spare-area size suitable for the medium on the basis of the acquired medium information; and
   allocating a spare area having the determined size on the medium.

8. The method for allocating a spare area on an optical disk medium according to claim 7, wherein:
   said medium information specific to the medium includes information about a manufacturer and a type number of the optical disk medium.

9. A method for allocating a spare area on an optical disk medium, in which if a recording area on the optical disk medium includes a defective sector, the spare area for alternate-recording of the defective sector is allocated to another area on the medium, said method comprising the steps of:
   measuring the optical disk medium for medium properties relating to error tolerance of the medium;
   determining the spare-area size of the medium on the basis of the measured medium properties; and
   allocating a spare area having the determined size on the medium.

10. The method for allocating a spare area on an optical disk medium according to claim 9, wherein:
    said medium properties relate to a recording sensitivity of the medium or an amount of axial deviation of a medium surface.

11. The optical disk drive according to claim 3, further comprising:
    a table update part which updates medium information, the medium properties, and a value of the spare-area size, which are stored in the table.

12. The optical disk drive according to claim 6, further comprising:
    a table update part which updates medium information, the medium properties, and a value of the spare-area size, which are stored in the table.

13. The optical disk drive according to claim 1, further comprising:
    a remaining amount detector which detects a remaining amount of a spare area on the optical disk medium during recording; and
    an area-size changing part which changes the size of the spare area on the basis of the remaining amount detected by the remaining amount detector;
    wherein said notification part notifies the host equipment of the spare-area size changed by the area-size changing part; and
    wherein according to an instruction from the host equipment, said area allocating part changes the spare-area size for allocating a spare area.

14. The optical disk drive according to claim 4, further comprising:
    a remaining amount detector which detects a remaining amount of a spare area on the optical disk medium during recording; and
    an area-size changing part which changes the size of the spare area on the basis of the remaining amount detected by the remaining amount detector;
    wherein said notification part notifies the host equipment of the spare-area size changed by the area-size changing part; and
    wherein according to an instruction from the host equipment, said area setting part changes the spare-area size of the medium for allocating a spare area.

* * * * *